June 27, 1967 A. Y. BROVERMAN ETAL 3,328,738
FIVE-LEGGED MAGNETIC CORE STRUCTURES AND WINDINGS WHICH
PRODUCE FLUX IN QUADRATURE
Filed April 23, 1965 2 Sheets-Sheet 1

WITNESSES
Theodore F. Wrobel
James F. Young

INVENTORS
Alvin Y. Broverman
& Garlington C. Wilburn
BY
Donald P. Lackey
ATTORNEY United States Patent Office 3,328,738
Patented June 27, 1967

3,328,738
FIVE-LEGGED MAGNETIC CORE STRUCTURES AND WINDINGS WHICH PRODUCE FLUX IN QUADRATURE
Alvin Y. Broverman, South Pymatuning Township, and Garlington C. Wilburn, Hickory Township, Sharpsville County, Pa., assignors to Westinghouse Electric Corporation, Pittsburgh, Pa., a corporation of Pennsylvania
Filed Apr. 23, 1965, Ser. No. 450,411
8 Claims. (Cl. 336—215)

This invention relates in general to electrical inductive apparatus, such as transformers, and more particularly to magnetic core structures for transformers.

The well known Scott transformer connection is commonly utilized for connecting a three-phase alternating current system to a two-phase alternating current system, with the main and teaser windings of the Scott connection generally being disposed in inductive relation with two entirely separate magnetic core structures. United States Patent 3,129,377 issued to G. R. Monroe et al. and assigned to the same assignee as the present application, disclosed a single magnetic core structure for use with the Scott connection, having two winding leg portions and an additional leg portion. The magnetic core structure taught by this patent enables the Scott connection to be accomplished with one magnetic core structure, with a substantial reduction in weight, size, losses and cost, over the prior art two core arrangement. It would be desirable, however, to provide a single core structure for use in interconnecting a three-phase electrical system with a two-phase electrical system, or for interconnecting any two electrical systems having voltages in quadrature, which requires even less magnetic core material than disclosed in the hereinbefore mentioned patent, lower core losses, and a lower overall core height.

Accordingly, it is an object of this invention to provide a new and improved magnetic core structure for electrical inductive apparatus.

Another object of the invention is to provide a new and improved magnetic core and coil assembly for connecting alternating current systems which have voltages in quadrature.

A further object of the invention is to provide a new and improved magnetic core and coil assembly for interconnecting alternating current electrical systems which has a lower height, uses less magnetic core material, and has lower core losses, than magnetic core and coil assemblies of the prior art.

Still another object of the invention is to provide a new and improved magnetic core structure for use with a transformer for interconnecting alternating current systems which have voltages in quadrature, in which a portion of the magnetic core is wound of magnetic material, and a portion is formed of a plurality of stacked magnetic laminations, to provide a magnetic core structure having lower losses and weight than a similar magnetic core structure of the stacked type.

Briefly, the present invention accomplishes the above cited objects by constructing a magnetic core having two outer and first, second and third intermediate leg portions or members disposed in spaced, parallel relation, with the main windings of the Scott connection being disposed on the first intermediate leg portion, and the teaser windings of the Scott connection being disposed on the third intermediate leg portion. The magnetic flux produced by current flow in the main windings and by current flow in the teaser windings, is thus split or divided into two portions, allowing the cross sectional area of each of the yoke members, each outer leg member, and the second intermediate leg member, to be substantially reduced, with corresponding reductions in magnetic material, core losses, and core heights. The fact that the magnetic flux produced by current flow in the teaser windings is in quadrature, or 90° out of phase with the flux produced by current flow in the main windings, is utilized to reduce the cross sectional area of the second intermediate leg, accordingly. This same principle may be utilized on other winding connections where certain of the voltages are in quadrature, such as the three-phase to three-phase T—T connection, and two-phase to two-phase connections.

One embodiment of the invention teaches a magnetic core structure which is completely of the stacked type, and another embodiment of the invention teaches a magnetic core structure having two wound portions and a stacked portion, assembled in side-by-side relation to provide a single, five-legged magnetic core structure which requires even less magnetic core material and has lower core losses than a similar magnetic core of the stacked type.

Further objects and advantages of the invention will become apparent as the following description proceeds and features of novelty which characterize the invention will be pointed out in particularity in the claims annexed to and forming a part of this specification.

For a better understanding of the invention, reference may be had to the following detailed description, taken in connection with the accompanying drawing, in which.

Figure 3:
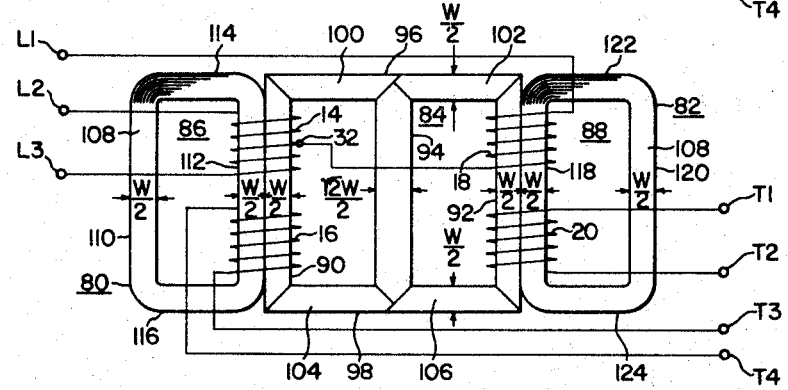
Figure 4:
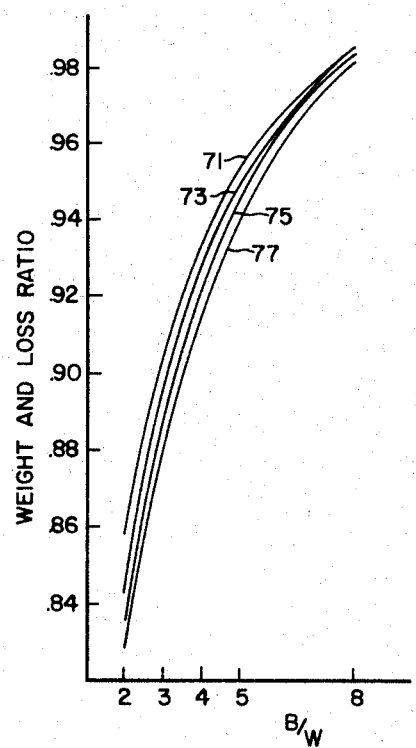

FIGURE 3 is an elevational view of a magnetic core structure, with schematic windings, for connecting a three-phase electrical system with a two-phase electrical system, constructed according to the teachings of another embodiment of the invention; and FIGURE 4 is a graph, comparing the weight and losses of a magnetic core constructed according to the teachings of the invention with a magnetic core constructed according to the teachings of the prior art.

Figure 1:
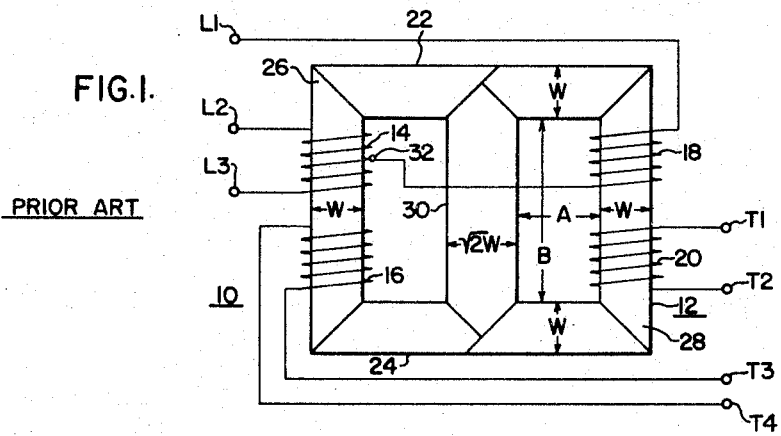
FIGURE 1 is an elevational view of the magnetic core structure of the prior art, for interconnecting electrical systems having voltages in quadrature, with the electrical windings being shown schematically.

Referring now to the drawings, and FIG. 1 in particular, there is shown a prior art transformer magnetic core and coil assembly 10, which is described in detail in the hereinbefore mentioned United States patent, for interconnecting electrical systems which have voltages in quadrature. In particular, transformer core and coil assembly 10 is illustrated adapted for connection between a three-phase electrical system at terminals L1, L2 and L3, and a two-phase electrical system at terminals T1, T2, T3 and T4. The transformer core-coil assembly 10 includes a single magnetic core assembly 12, with first and second main electrical windings 14 and 16, and first and second teaser electrical windings 18 and 20, disposed in inductive relation therewith. The magnetic core assembly 12 is constructed of a plurality of stacked layers of assembled laminations formed from magnetic strip material, having at least one preferred direction of magnetic orientation parallel with the longitudinal dimension of the material, such as cold rolled silicon steel. The magnetic core 12 includes yoke portions 22 and 24, which connect spaced, parallel outer leg portions 26 and 28, and intermediate leg portion 30, to form a substantially rectangular core having two substantially rectangular windows or openings through which the turns of the windings or coils may pass. Yoke portions 22 and 24 may each be constructed of a plurality of laminations in each layer, as shown.

The first and second main electrical windings or coils 14 and 16 are inductively disposed on the first outer leg portion 26 of magnetic core 12. The first and second teaser electrical windings or coils 18 and 20 are disposed on the second outer leg portion 28 of the magnetic core 12. The first main winding 14 is connected to line terminals L2 and L3 of an associated three-phase electrical system, and the second main winding 16 is connected to terminals T3 and T4 of an associated two-phase electrical system. The first teaser winding 18 is connected to line terminal L1 of the associated three-phase alternating current system, and to a mid-tap connection 32 on the first main winding 14. The second teaser winding 20 is connected to terminals T1 and T2 of the associated two-phase electrical system. The current which flows between the second teaser winding 20 and the associated two-phase electrical system at terminals T1 and T2 is substantially 90° out of phase with the current which flows between the second main winding 16 and the associated two-phase alternating current system at terminals T3 and T4. The magnetic flux produced by current flow in the main windings 14 and 16 in the first outer leg portion 26 and the intermediate leg portion 30, is therefore substantially 90° out of phase with the magnetic flux produced in the second outer leg portion 28 and the intermediate leg portion 30 by current flow in the teaser windings 18 and 20. The resultant magnetic flux in the intermediate leg portion 30 is thus equal to $\sqrt{2}$ or approximately 1.4 times the magnetic flux which flows in each of the first and second outer leg portions of the magnetic core 12. In order for the magnetic flux density in the intermediate leg portion of the magnetic core 12 to be substantially the same as in each of the first and second outer leg portions of the magnetic core 12, assuming that the stacks of laminations all have the same build or stacked height, the width of the intermediate leg portion should be $\sqrt{2}$ or 1.4 times the width of each of the first and second outer leg laminations 26 and 28, respectively, and the corresponding cross sectional area of the intermediate leg portion 30 is also substantially 1.4 times the cross sectional area of the first and second outer leg portions 26 and 28. Thus, assuming that the width of each of the first and second outer leg portions 26 and 28 is W, the yoke portions will each require a width of at least W, since the same magnetic flux that flows through the first and second outer leg portions also flows through its associated yoke portion, and the width of the intermediate leg member should be 1.4W, because the resultant of the magnetic flux flowing through the intermediate leg member due to the two 90° out of phase magnetic fluxes is 1.4 times the flux flowing in one of the winding legs. This three-legged, single magnetic core structure for a transformer for interconnecting electrical systems which have voltages in quadrature, has many advantages over the practice of utilizing separate transformers and separate magnetic core structures for the main and teaser windings, in size, weight, efficiency and cost. It would be desirable, however, if a single transformer and magnetic core structure for interconnecting electrical systems having voltages in quadrature could be provided, which utilizes less magnetic material, has lower core losses, and has a lower core height than the three-legged core structure shown in FIG. 1.

FIGS. 2, 2A, 2B and 3 are elevational views of magnetic core-coil assemblies constructed according to the teachings of this invention, which possess the above-mentioned advantages over the prior art single core, three-legged arrangement for interconnecting electrical systems having voltages in quadrature. In general, the magnetic core resembles the five-legged magnetic core structure commonly utilized in large three-phase transformers which have three winding legs and voltages 120° out of phase, but, as will be hereinafter described, the relationship of the electrical coils to the magnetic core structure, as well as the relationship of the sizes of the various yoke and leg portions, is entirely different.

Figure 2:
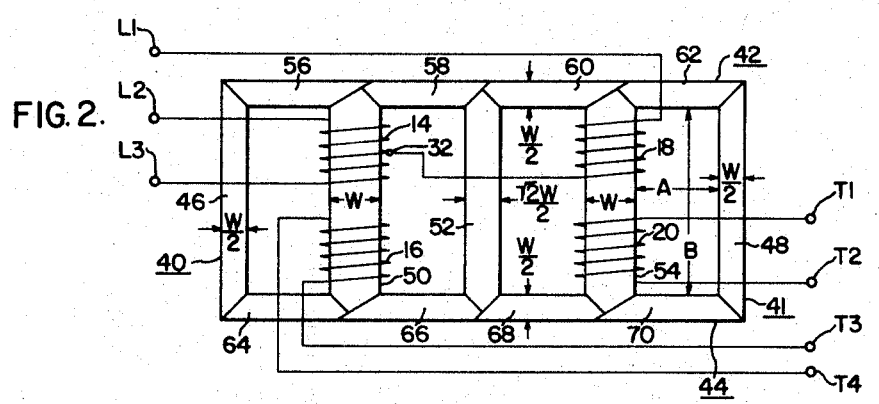
FIGURE 2 is an elevational view of a magnetic core structure, with schematic windings, for connecting a three-phase electrical system with a two-phase electrical system, constructed according to the teachings of one embodiment of the invention.

Referring now to FIG. 2, there is shown a transformer magnetic core-coil assembly 40, including a magnetic core 41 and associated electrical coils 14, 16, 18 and 20, adapted for connection between a three-phase electrical system, represented by line terminals L1, L2 and L3, and a two-phase electrical system, represented by line terminals T1, T2, T3 and T4. Since the main and teaser windings are connected to the line terminals L1, L2, L3, T1, T2, T3 and T4, and to each other, as hereinbefore described relative to FIG. 1, the windings are given the same reference numerals as in FIG. 1.

Magnetic core structure 41 is generally rectangular in configuration and includes four substantially rectangular windows or openings through which the turns of the associated windings pass. Magnetic core 41 includes a plurality of stacked layers of assembled laminations formed from magnetic strip or sheet material having at least one preferred direction of magnetic orientation lengthwise of said material, or substantially parallel to the longitudinal dimension of said material, such as cold rolled silicon steel. Doubly oriented magnetic material, which also possesses a second direction of magnetic orientation substantially perpendicular to the first preferred direction, may also be utilized.

The various stacks of laminations all have the same build or stack height, and are assembled to form upper and lower yoke portions or members 42 and 44, respectively, first and second outer leg members 46 and 48, respectively, and first, second and third intermediate leg members 50, 52 and 54, respectively. Each layer of laminations thus includes two outer and three intermediate leg laminations. The upper and lower yoke portions may each include a plurality of laminations per layer, as shown. For example, the upper yoke portion may include laminations 56, 58, 60 and 62, and the lower yoke portion may include laminations 64, 66, 68 and 70. Each of the upper yoke laminations may have substantially the same dimensions as the corresponding lower yoke laminations. In order to provide low loss joints, the ends of the various laminations which make up each layer of assembled laminations may have their ends cut at an oblique angle to the direction of magnetic orientation which is parallel with the longitudinal dimension of the laminations, and the joints in each succeeding layer of laminations may be offset from one another, to form butt-lap, or stepped-lap type joints, as is well known in the art. The type of joint utilized may have some affect on the width of the yoke portions, but for purposes of explanation, it will be assumed that the width of the yoke portions is determined solely for magnetic reasons. Any particular type of joint would affect the cores of FIGS. 1 and 2 equally, so in comparing the relative sizes of the two magnetic cores, the joint type is not important.

The first and second main windings or coils 14 and 16, respectively, of the magnetic core and coil assembly 40, are disposed in inductive relation with the first intermediate leg member 50 of the magnetic core 42. The first and second teaser windings or coils 18 and 20, respectively, are inductively disposed on the third intermediate leg member 54 of the magnetic core structure 41. The first and third intermediate leg members may have a cruciform or rectangular cross section, as desired in any particular application. Thus, the main and teaser winding leg portions 50 and 54, respectively, are separated by intermediate leg member 52, the main winding leg 50 is adjacent the first outer leg member 46, and the teaser winding leg 54 is adjacent the second outer leg member 48. As illustrated, the various leg members are disposed in spaced parallel relation, which forms four substantially rectangular windows or openings required for receiving the turns of the main and teaser windings.

With the hereinbefore described arrangement of the main and teaser windings, with the first main winding connected to three-phase line terminals L2 and L3, the second main winding connected to the two-phase line terminals T3 and T4, the first teaser winding connected to three-phase line terminal L1 and the mid-tap 32 of the first main winding 14, and the second teaser winding 20 connected to two-phase line terminals T1 and T2, the magnetic flux produced by current flow in the main windings 14 and 16 in the first intermediate leg member 46, the first intermediate leg member 50, and the central or second intermediate leg member 52, is substantially 90° out of phase with the magnetic flux produced in the second outer leg member 48, the second intermediate leg member 52 and the third intermediate leg member 54, by current flow in the teaser windings 18 and 20. The flux which flows in the main winding leg 50, does not all flow through the second intermediate leg member 52, because the magnetic circuit is split at the upper and lower yoke portions 42 and 44, respectively, allowing the flux in winding leg 50 to flow through outer winding leg 46 and second intermediate winding leg 52. The mean lengths of the two magnetic circuits are not exactly the same, but for purposes of explanation it will be assumed that the reluctance of the two magnetic circuits is substantially the same, with the flux from winding leg 50 dividing the two substantially equal portions. Thus, one-half of the flux will flow through the portion of the upper yoke 42 represented by lamination 56, outer leg member 46, and the portion of the lower yoke 44 represented by lamination 64. The other half of the magnetic flux from main winding leg 50 will flow through the portion of upper yoke 42 represented by lamination 58, second intermediate leg portion 52, and the portion of the lower yoke 44 represented by lamination 66. In like manner, the flux produced in teaser leg member 54 by current flow in teaser windings 18 and 20 will divide into two substantially equal portions, with one half proceeding through the portion of the upper yoke 42 represented by lamination 62, the second outer leg member 48, and the portion of the lower yoke 44 represented by lamination 70. The other half of the flux will proceed through the portion of the upper yoke represented by lamination 60, the second intermediate leg member 52, and the portion of the lower yoke 44 represented by lamination 68. Assuming that the magnetic flux flowing through the main and teaser winding legs 50 and 54 requires that the winding legs each have a width of W, the width of the upper and lower yoke portions 42 and 44, respectively, and the width of the first and second outer leg portions 46 and 48, respectively, may each be ½W, and still maintain the same flux density, assuming the stacks all have the same build height. The cross-sectional areas of the upper and lower yoke portions 42 and 44, and the first and second outer leg portions 46 and 48, will also be equal to one half the cross sectional area of one of the winding leg portions 50 or 54.

The second intermediate leg portion 52 will have one-half of the flux from main winding leg 50 and one-half of the flux from teaser winding leg 54 flowing therethrough. However, as hereinbefore described, the magnetic flux in the main winding leg 50 is 90° out of phase with the magnetic flux from the teaser winding leg 54. The resultant flux in the second intermediate leg is, therefore, not the arithmetic sum of the magnetic flux from the two winding legs, but is equal to $\sqrt{2}$ or 1.4 times the flux from one of the winding legs. Therefore, the second intermediate leg member or portion requires a width that is $$\frac{\sqrt{2}}{2}$$

or approximately .7 times the width W of the main or teaser winding leg. Further, the cross sectional area of the central intermediate leg should be .7 times the cross sectional area of the main or teaser winding leg, in order to maintain the same flux density throughout the magnetic core structure.

In summary, assuming that all of the leg and yoke portions are the same stack build, if the width of the main and teaser winding legs 50 and 54 are each assumed to be equal to W, the width of the upper and lower yoke portions 42 and 44, and the width of the outer leg members should be equal to W/2, and the width of the central leg member should be equal to .7W, in order to maintain the magnitude of the flux density that exists in the main and teaser winding legs the same throughout the core structure.

Assuming that the window opening in the prior art single core structure shown in FIG. 1 is the same as the window opening in the magnetic core structure shown in FIG. 2, and that the height of the window opening is equal to B and the width of the window opening is equal to A, the overall height of the prior art core structure of FIG. 1 would be equal to the window height B plus the width of the upper and lower yoke portions 22 and 24, respectively, or 2W. The total core height, therefore, can be expressed at $B+2W$. The total core height of the magnetic core structure shown in FIG. 2 would be equal to the height of the window opening plus the width of the upper and lower yoke portions 42 and 44, respectively, which may be expressed as $B+W$. Therefore, the total height of a magnetic core constructed according to the teachings of the embodiment of the invention shown in FIG. 2, would be less than the height of the prior art core structure by the distance W. This is an important height reduction on large transformers, where shipping restrictions limit the overall height of a transformer.

It will also be noted by comparing the core construction of FIG. 2 with the magnetic core construction of FIG. 1, that the FIG. 2 magnetic core has less projected area in the plane of the length of the magnetic circuit, thus reducing the weight, reluctance, and losses of the magnetic core. The degree of savings is illustrated by the family of curves shown in the graph of FIG. 4. The ordinate of the graph shown in FIG. 4 illustrates the ratio of the weight of a five-legged magnetic core constructed according to embodiment of the invention shown in FIG. 2, with the weight of a three-length magnetic core constructed as shown in FIG. 1. This same ratio would also apply to the reduction in core losses. The ratio of core opening height B to the width W of the core laminations is plotted on the abscissa. Curves 71, 73, 75 and 77 represent the weight and loss ratios for magnetic cores which have ratios of core opening height B to core opening width A of 2, 3, 5 and 8, respectively. For example, magnetic cores were constructed for a 750 kva. three-phase to two-phase transformer, each having the same window dimensions and stack build, according to the teachings of both FIG. 1 and FIG. 2. The magnetic core constructed according to the prior art teachings of FIG. 1 weighed 2020 pounds, and the magnetic core constructed according to the teachings of FIG. 2 weighed 1817 pounds. Thus, the transformer core construction of FIG. 1 requires 11.1% more magnetic material than the core construction of FIG. 2, thus increasing the core losses approximately 11.1%.

A magnetic core constructed according to the teachings of the embodiment of the invention shown in FIG. 2 would have a lower overall height than a similarly rated prior art single core design, by at least the width of one of the winding legs, and the prior art core structure would require approximately 10% more iron than the core structure of FIG. 2. A magnetic core constructed according to the teachings of this invention would also have lower losses than a similarly rated three legged construction, because less magnetic material is required.

Figure 2A:
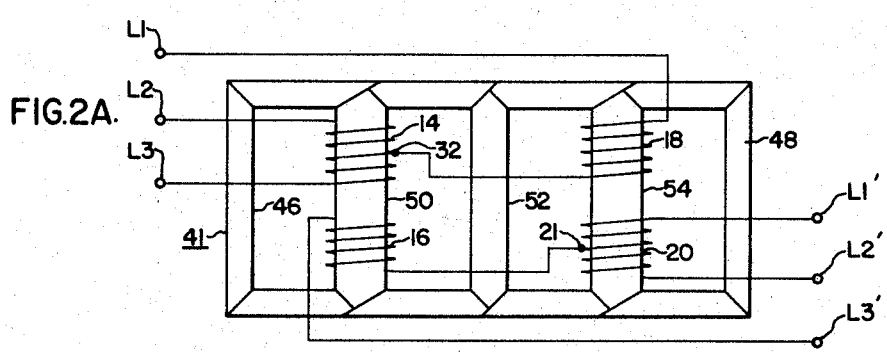
FIGURES 2A and 2B illustrate other winding connections for interconnecting electrical systems which have voltages in quadrature, with FIG. 2A illustrating the T—T connection for interconnecting three-phase electrical systems, and FIG. 2B illustrating a winding arrangement for interconnecting two-phase electrical systems.
Figure 2B:
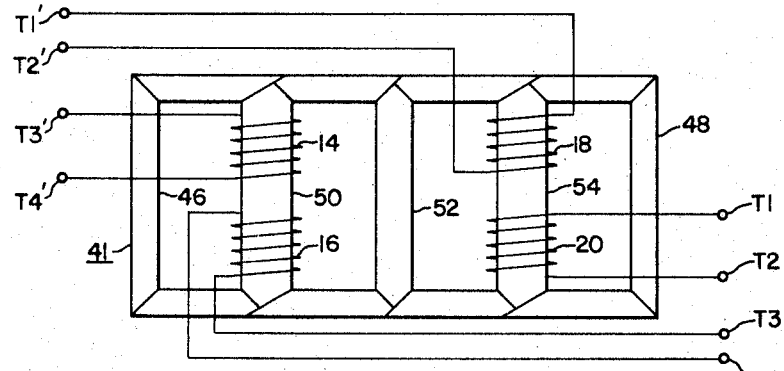

FIGS. 2A and 2B illustrate other winding arrangements in which certain voltages are in quadrature, which may also advantageously utilize a magnetic core constructed according to the teachings of FIG. 2.

FIG. 2A illustrates the T—T connection for interconnecting three-phase electrical systems. The winding arrangement of FIG. 2A differs from that of FIG. 2 in that windings 20 and 16 have terminals L1', L2', and L3' adapted for connection to a three-phase electrical system, and one end of winding 16 is connected to a mid-tap 21 on winding 20.

FIG. 2B illustrates a winding arrangement for interconnecting two-phase electrical systems. The winding arrangement of FIG. 2B differs from that of FIG. 2 in that windings 14 and 18 are adapted for connection to a two-phase electrical system at terminals T1', T2' and T4', and winding 18 is not connected to winding 14.

FIG. 3 illustrates an elevational view of a magnetic core-coil assembly 80, constructed according to another embodiment of the invention. The core-coil assembly 80 embodies the same general five-legged structure discussed relative to FIG. 2, presenting the same reduction in overall core height over the prior art three-legged construction, as the embodiment of FIG. 2. The construction of the transformer core of FIG. 3, however, provides additional savings in core weight and core losses.

In general, the embodiment of FIG. 3 combines wound core construction with stacked core construction, to provide the advantages of single-phase wound core performance for approximately 50% of the magnetic core, which reduces core losses, and also saves magnetic core material by eliminating the right angle corners associated with stacked core construction. The efficient combination of the stacked and wound construction is made possible in a transformer core design which has voltages 90° out of phase, because the outer leg member and upper and lower yoke portions all have a width equal to one-half the width W of a winding leg. Thus, by winding the wound sections of magnetic material having a strip width equal to the stacked height of the stacked section, making the build of the wound section equal to $W/2$, and making the width of the laminations which form the outer legs of the stacked section equal to $W/2$, one of the legs of each of the wound sections may be disposed adjacent to one of the outer legs of the stacked section, to form intermediate winding legs each having a combined width equal to W.

More specifically, the core-coil assembly 80 of FIG. 3 includes first and second main, and first and second teaser windings or coils 14, 16, 18, and 20, respectively, as hereinbefore described relative to FIGS. 1 and 2, and a magnetic core structure 82. Magnetic core structure 82 includes three sections, which are disposed in assembled, side-by-side relation to form the complete magnetic core structure 82. Magnetic core structure 82 has a stacked, three-legged inner section 84, a first wound outer loop or section 86, and a second wound outer loop or section 88. Stacked inner section 84 includes first and second outer leg members 90 and 92, an inner leg member 94, and upper and lower yoke portions 96 and 98, respectively, all stacked to a predetermined build. Outer and inner leg portions 90, 92 and 94 of stacked core section 84, are disposed in spaced parallel relation, and are connected with upper and lower yoke portions 96 and 98, respectively, to form two substantially rectangular openings or windows. The various stacked yoke and leg members are each formed of a plurality of stacked or superposed laminations of magnetic material, as hereinbefore described relative to FIG. 2, with the upper and lower yoke members each including two laminations per layer, 100 and 102, and 104 and 106, if desired, as shown in FIG. 3.

As hereinbefore described, the ends of the lamination in each layer may be cut oblique to the perferred direction of magnetic orientation which is parallel with the longitudinal dimension of the lamination, to reduce joint losses, and the joints in succeeding layers may be stepped or staggered relative to one another, to further reduce joint losses, as is well known in the art. It would be preferable in this embodiment of the invention to utilize a joint construction which does not require widening the yoke portions, because of its requirement of being physically matched with wound sections 86 and 88. It would also be preferable to utilize a rectangular winding leg section, as opposed to a cruciform cross section, because of the combining of the stacked leg with a wound leg to form the winding legs of the magnetic core structure. However, it is not mandatory, as it is possible to wind a leg having a predetermined cross section which when combined with a predetermined cross section of a stacked leg would form a cruciform cross section.

Assuming the same stacked build, the width of the various portions of the stacked section 84, with the main and teaser winding legs each having a width W, are $W/2$ for the outer leg portions 90 and 92 and the upper and lower yoke portions 96 and 98. The leg portion 94, would then require a width of $$\frac{\sqrt{2}}{2}W \text{ or } .7W$$

because the resultant flux in leg portion 94 from the two magnetic fluxes 90° out of phase, is equal to $\sqrt{2}$ times the flux in one of the winding legs.

The wound sections 86 and 88 of magnetic core 82 may be wound of continuous magnetic strip material, having at least one preferred direction of magnetic orientation parallel with the longitudinal dimension of the strip, and having a width substantially the same as the build or stack height of the stacked section 84. The wound core should have a window opening substantially the same size as the window openings in the stacked portion 84, and may be constructed with any predetermined desired joint design, such as the stepped lap pattern 108, shown in FIG. 3. United States Patent 2,972,804 issued Feb. 28, 1961 to B. B. Ellis, and assigned to the same assignee as the present application, describes in detail the construction of a wound magnetic core having a stepped-lap joint design. The build of the wound lamination should be equal to $W/2$, where W is the desired width of the winding legs.

Both wound sections 86 and 88, are formed in a similar manner, to substantially the same shape, with wound section 86 being formed to have leg portions 110 and 112 and upper and lower yoke portions 114 and 116, respectively, and wound section 88 being formed to have leg portions 118 and 120, and upper and lower yoke portions 122 and 124, respectively. To form the complete magnetic core structure 82, leg 112 of wound section 86 is disposed adjacent to and adjoining leg 90 of stacked section 84, and leg 118 of wound section 88 is disposed adjacent to and adjoining leg 92 of stacked section 84, to form a structure having five legs. The main windings 14 and 16 are disposed in inductive relation with the leg portion formed by the adjoining leg members 112 and 90, and teaser windings 18 and 20 are disposed in inductive relation with the leg portion formed by the adjoining leg members 92 and 118. Thus, the complete magnetic core structure 82 has the same leg and yoke widths as the corresponding portions of magnetic core 40 shown in FIG. 2. The magnetic core shown in FIG. 3, however, has a lower weight due to the elimination of the corners through use of wound sections 86 and 88, and the core would have lower losses due to this reduction in magnetic material, and also due to the lower reluctance presented by the wound sections. Further savings in weight could be realized by reducing the cross section of the wound portions 86 and 88, to make the reluctance of the wound magnetic circuit equal to the reluctance of the stacked magnetic circuits.

A magnetic core constructed according to the teachings of the embodiment of the invention shown in FIG. 3, for a 750 kva., three-phase to two-phase transformer, having the same yoke and leg cross sectional areas and widths as the magnetic core for the same rating constructed according to the embodiment of the invention shown in FIG. 2, weighed 1746 pounds. As hereinbefore stated, the magnetic core constructed for a 750 kva. three-phase to two-phase transformer, built according to the embodiment of the invention shown in FIG. 2, weighed 1817 pounds. Thus, a magnetic core constructed according to the embodiment of the invention shown in FIG. 2 requires approximately 4% more magnetic material than a magnetic core constructed according to the embodiment of the invention shown in FIG. 3, and also has at least 4% higher core losses. As hereinbefore stated, the losses of a magnetic core constructed according to the invention shown in FIG. 3 will be even lower, however, due to the lower reluctance of the wound sections 86 and 88.

Since the three legged core of the prior art (FIG. 1) requires 11.1% more magnetic material than a magnetic core constructed according to the embodiment shown in FIG. 2, and a magnetic core constructed according to the embodiment of FIG. 2 requires 4% more magnetic material than a magnetic core constructed according to the embodiment of FIG. 3, it will be evident that the savings in magnetic material and losses when comparing the prior art three legged core structure with the embodiment of FIG. 3, is very substantial.

Other winding arrangements for connection to polyphase electrical systems wherein certain voltages are in quadrature, such as those shown in FIGS. 2A and 2B, may also be utilized with the magnetic core construction shown in FIG. 3.

In summary, there has been disclosed new and improved magnetic core-coil assemblies for transformers for use in interconnecting, polyphase electrical systems, which have voltages in quadrature, which are lower in overall core height, have a shorter mean magnetic circuit, have lower losses, and require less magnetic material than comparably rated single core transformers of the prior art.

Since numerous changes may be made in the above described apparatus and different embodiments of the invention may be made without departing from the spirit thereof, it is intended that all matter contained in the foregoing description or shown in the accompanying drawings shall be interpreted as illustrative, and not in a limiting sense.

We claim as our invention:

1. A magnetic core structure for a transformer comprising, first and second outer leg portions, first, second and third intermediate leg portions, yoke portions connecting the ends of said leg portions, said first and third intermediate leg portions being adapted for receiving electrical windings which produce magnetic flux in said first and third leg portions 90° out of phase with one another, the cross sectional area of said first intermediate leg portion being substantially the same as the cross sectional area of said third intermediate leg portion, the cross sectional areas of said yoke and first and second outer leg portions being one-half the cross sectional area of said first intermediate leg portion, the cross sectional area of said second intermediate leg portion being .7 times the cross sectional area of said first intermediate leg portion.

2. A transformer for connecting a three-phase electrical system with a two-phase electrical system comprising, a magnetic core, said magnetic core having first and second outer leg portions, first, second and third intermediate leg portions, and yoke portions connecting the ends of said leg portions, the cross sectional area of said first intermediate leg portion being substantially the same as the cross sectional area of said third intermediate leg portion, the cross sectional areas of said yoke and first and second outer leg portions being one-half the cross sectional area of said first intermediate leg portion, the cross sectional area of said second intermediate leg portion being .7 times the cross sectional area of said first intermediate leg portion, first and second main windings disposed in inductive relation with said first intermediate leg portion, first and second teaser windings disposed in inductive relation with said third intermediate leg portion, one end of said first teaser winding being connected to substantially the mid-point of said first main winding, the remaining end of said first teaser winding and both ends of said first main winding being adapted for connection to a three-phase electrical system, the ends of said second main and second teaser windings being adapted for connection to a two-phase electrical system.

3. A magnetic core structure for a transformer comprising, first and second outer leg portions, first, second and third intermediate leg portions, yoke portions connecting the ends of said leg portions to define four substantially rectangular windows, said yoke and leg portions each having a plurality of superposed layers of laminations formed from magnetic material and stacked to a predetermined build, said first and third intermediate leg portions being adapted for receiving electrical windings which produce magnetic flux in said first and third intermediate leg portions 90° out of phase with one another, the width of the laminations which form said first intermediate leg portion being substantially the same as the width of the laminations which form said third intermediate leg portion, the width of the laminations which form said yoke and first and second outer leg portions being one-half the width of the laminations which form said first intermediate leg portion, the width of the laminations which form said second intermediate leg portion being .7 times the width of the laminations which form said first intermediate leg portion.

4. A transformer for connecting a three-phase electrical system with a two-phase electrical system comprising, a magnetic core, said magnetic core having first and second outer leg portions, first, second and third intermediate leg portions, and yoke portions connecting the ends of said leg portions to define four substantially rectangular windows, said yoke and leg portions each having a plurality of superposed layers of laminations formed from magnetic material and stacked to a predetermined build, the width of the laminations which form said first intermediate leg portions being substantially the same as the width of the laminations which form said third intermediate leg portions, the width of the laminations which form said yoke and first and second outer leg portions being one-half the width of the laminations which form said first intermediate leg portion, the width of the laminations which form said second intermediate leg portion being .7 times the width of the laminations which form said first intermediate leg portion, first and second main windings disposed in inductive relation with said first intermediate leg portion, first and second teaser windings disposed in inductive relation with said third intermediate leg portion, one end of said first teaser winding being connected to substantially the mid-point of said first main winding, the remaining end of said firrst teaser winding and both ends of said first main winding being adapted for connection to a three-phase electrical system, the ends of said second main and second teaser windings being adapted for connection to a two-phase electrical system.

5. A five-legged magnetic core structure having yoke portions connecting two outer and first, second and third intermediate leg portions comprising, first, second and third magnetic core sections disposed in side-by-side relation to form a single magnetic core structure, said second magnetic core section including first, second and third leg portions and yoke portions connecting the ends of said leg portions, the yoke and leg portions of said second magnetic core section each having a plurality of superposed layers of laminations formed from magnetic material and stacked to a predetermined build, said yoke and first and third leg portions of said second magnetic core section all being formed of laminations having substantially the same width, said first and third magnetic core sections each being wound of magnetic material having a width substantially the same as the predetermined build of said stacked laminations in said second magnetic core section, said first and third magnetic core sections each being wound to a build which is substantially the same as the width of the laminations which form the yoke and first and third leg portions of said second magnetic core section, said first and third magnetic core sections each being substantially rectangular in shape and each having leg portions and yoke portions, one of the leg portions of said first magnetic core section being disposed against the first leg portion of said second magnetic core section, with said adjoining leg portions forming the first intermediate leg portion of said five-legged magnetic core structure, one of the leg portions of said third magnetic core section being disposed against the third leg portion of said second magnetic core section, with said adjoining leg portions forming the third intermediate leg portion of said five-legged magnetic core structure, said first and third intermediate leg portions of said five-legged magnetic core being adapted for receiving electrical coils which produce magnetic flux 90° out of phase with one another, said second leg portion of said second magnetic core section forming the second intermediate leg portion of said five-legged magnetic core, the width of the laminations which form said second intermediate leg portion of said five-legged magnetic core being .7 times the width of the first intermediate leg portions of said five-legged magnetic core.

6. A transformer for connecting a three-phase electrical system with a two-phase electrical system comprising, a five-legged magnetic core structure having yoke portions connecting two outer and first, second and third intermediate leg portions, said five-legged magnetic core structure including first, second and third magnetic core sections disposed in side-by-side relation to form a single magnetic core structure, said second magnetic core section including yoke portions connecting the ends of first, second and third leg portions, the yoke and leg portions of said second magnetic core section each having a plurality of superposed layers of laminations formed from magnetic material and stacked to a predetermined build, said yoke and first and third leg portions of said second magnetic core section all being formed of laminations having substantially the same width, said first and third magnetic core sections being wound of magnetic material having a width substantially the same as the predetermined build of said stacked laminations in said second magnetic core section, said first and third magnetic core sections each being wound to a build which is substantially the same as the width of the laminations which form the yoke and first and third leg portions of said second magnetic core section, said first and third magnetic core sections each being substantially rectangular in shape and each having leg and yoke portions, one of the leg portions of said first magnetic core section being disposed against the first leg portion of said second magnetic core section, with the adjoining leg portions forming the first intermediate leg portion of said five-legged magnetic core, one of the leg portions of said third magnetic core section being disposed against the third leg portion of said second magnetic core section, with said adjoining leg portions forming the third intermediate leg portion of said five-legged magnetic core, said second leg portion of said second magnetic core section forming the second intermediate leg portion of said five-legged magnetic core, the width of the laminations which form said second intermediate leg portion of said five-legged magnetic core being .7 times the width of the first intermediate leg portion of said five-legged magnetic core, first and second main windings disposed in inductive relation with said first intermediate leg portion, first and second teaser windings disposed in inductive relation with said third intermediate leg portion, one end of said first teaser winding being connected to substantially the mid-point of said first main winding, the remaining end of said first teaser winding and both ends of said first main winding being adapted for connection to a three-phase electrical system, the ends of said second main and second teaser windings being adapted for connection to a two-phase electrical system.

7. A transformer for connecting a first three-phase electrical system with a second three-phase system comprising, a magnetic core, said magnetic core having first and second outer leg portions, first, second and third intermediate leg portions, and yoke portions connecting the ends of said leg portions, the cross sectional area of said first intermediate leg portion being substantially the same as the cross sectional area of said third intermediate leg portion, the cross sectional areas of said yoke and first and second outer leg portions being one-half the cross sectional area of said first intermediate leg portion, the cross sectional area of said second intermediate leg portion .7 times the cross sectional area of said first intermediate leg portion, first and second windings disposed in inductive relation with said first intermediate leg portion, third and fourth windings disposed in inductive relation with said third intermediate leg portion, one end of said third winding being connected to substantially the mid-point of said first winding, the remaining end of said third winding and both ends of said first winding being adapted for connection to the first three-phase electrical system, one end of said second winding being connected to substantially the mid-point of said fourth winding, the remaining end of said second winding and both ends of said fourth winding being adapted for connection to said second three-phase system.

8. A transformer for connecting a first two-phase electrical system with a second two-phase electrical system comprising, a magnetic core, said magnetic core having first and second outer leg portions, first, second and third intermediate leg portions, and yoke portions connecting the ends of said leg portions, the cross sectional area of said first intermediate leg portion being substantially the same as the cross sectional area of said third intermediate leg portions, the cross sectional areas of said yoke and first and second outer leg portions being one-half the cross sectional area of said first intermediate leg portion, the cross sectional area of said second intermediate leg portion being .7 times the cross sectional areas of said first intermediate leg portion, first and second windings disposed in inductive relation with said first intermediate leg portion, third and fourth windings disposed in inductive relation with said third intermediate leg portion, the ends of said first and third windings being adapted for connection to said first two-phase electrical system, the ends of said second and fourth windings being adapted for connection to said second two-phase system.

References Cited

UNITED STATES PATENTS

| 1,425,091 | 8/1922 | Horelick | 336—215 XR |
| 2,595,753 | 5/1952 | Beardsley | 336—12 XR |
| 2,779,926 | 1/1957 | Johnson et al. | 336—5 |
| 2,922,972 | 1/1960 | Gordy | 336—215 |
| 3,129,377 | 4/1964 | Monroe et al. | 336—217 XR |

FOREIGN PATENTS 91,930   8/1959   Netherlands.

LEWIS H. MYERS, *Primary Examiner.*

T. J. KOZMA, *Assistant Examiner.*